United States Patent
Hoesel

(10) Patent No.: US 8,214,072 B2
(45) Date of Patent: Jul. 3, 2012

(54) APPARATUS FOR MONITORING AND SECURING DANGER ZONES ON POWER-DRIVEN TEXTILE MACHINES

(75) Inventor: Fritz Hoesel, Moenchengladbach (DE)

(73) Assignee: Truetzschler GmbH & Co. KG, Moenchengladbach (DE)

( * ) Notice: Subject to any disclaimer, the term of this patent is extended or adjusted under 35 U.S.C. 154(b) by 1046 days.

(21) Appl. No.: 12/076,775

(22) Filed: Mar. 21, 2008

(65) Prior Publication Data
US 2009/0024245 A1  Jan. 22, 2009

(30) Foreign Application Priority Data
Mar. 23, 2007  (DE) .......................... 10 2007 014 612

(51) Int. Cl.
G06F 19/00  (2006.01)
(52) U.S. Cl. ....................................................... 700/143
(58) Field of Classification Search .................. 700/130, 700/139–143; 340/541–543, 550–567; 19/0.21, 19/80 R
See application file for complete search history.

(56) References Cited

U.S. PATENT DOCUMENTS

| | | | | |
|---|---|---|---|---|
| 4,446,602 A * | 5/1984 | Marx et al. | | 19/21 |
| 4,479,285 A * | 10/1984 | Ragan | | 19/64.5 |
| 4,661,797 A * | 4/1987 | Schmall | | 340/561 |
| 4,674,057 A * | 6/1987 | Caughman et al. | | 700/258 |
| 4,804,860 A * | 2/1989 | Ross et al. | | 307/117 |
| 4,887,070 A * | 12/1989 | Pinto et al. | | 340/561 |
| 5,136,155 A * | 8/1992 | Kyburz et al. | | 250/221 |
| 5,280,622 A * | 1/1994 | Tino | | 700/255 |
| 5,323,513 A * | 6/1994 | Binder et al. | | 19/80 R |
| 5,731,832 A * | 3/1998 | Ng | | 348/155 |
| 5,758,298 A * | 5/1998 | Guldner | | 701/23 |
| 6,055,042 A * | 4/2000 | Sarangapani | | 356/4.01 |
| 6,737,970 B2 * | 5/2004 | Wuestefeld et al. | | 340/552 |
| 6,829,371 B1 * | 12/2004 | Nichani et al. | | 382/103 |
| 6,884,989 B2 * | 4/2005 | Murata | | 250/221 |
| 7,030,363 B2 * | 4/2006 | Watanabe et al. | | 250/221 |
| 7,505,620 B2 * | 3/2009 | Braune et al. | | 382/152 |
| 7,768,549 B2 * | 8/2010 | Cofer | | 348/152 |
| 7,783,386 B2 * | 8/2010 | Merte et al. | | 700/255 |

(Continued)

FOREIGN PATENT DOCUMENTS

DE          37 33 972 A1    4/1989

(Continued)

OTHER PUBLICATIONS

UK Intellectual Property Office Search Report, dated Jun. 12, 2008, issued in connection with counterpart British Application No. GB0805126.0.

(Continued)

*Primary Examiner* — Danny Worrell
(74) *Attorney, Agent, or Firm* — Venable LLP; Robert Kinberg; Leigh D. Thelen

(57) ABSTRACT

In an apparatus for monitoring and securing danger zones on power-driven textile machines, in particular spinning room preparatory machines, having movable machine parts, an optical monitoring device monitors a movable danger zone to form a movable protection zone, such that a person and/or an object intruding into the danger zone triggers a switching operation. To produce an apparatus that allows guarding of danger zones in a simple and reliable manner, stationary monitoring device is present, which is selectively activatable and forms a dynamically movable protection zone around the movable danger zone.

20 Claims, 8 Drawing Sheets

U.S. PATENT DOCUMENTS

| | | | |
|---|---|---|---|
| 2001/0041077 A1* | 11/2001 | Lehner et al. | 396/661 |
| 2002/0061134 A1* | 5/2002 | Cofer et al. | 382/181 |
| 2002/0186299 A1* | 12/2002 | Cofer | 348/152 |
| 2004/0089793 A1* | 5/2004 | Watanabe et al. | 250/221 |
| 2008/0021597 A1 | 1/2008 | Merte et al. | |

FOREIGN PATENT DOCUMENTS

| | | |
|---|---|---|
| DE | 42 34 606 C2 | 4/1994 |
| DE | 20 2004 019 536 U1 | 3/2005 |
| DE | 10 2004 041 821 A1 | 3/2006 |
| DE | 10 2004 048 563 A1 | 4/2006 |
| EP | 03 79 465 A1 | 7/1990 |
| WO | WO 2007/085330 A1 | 8/2007 |

OTHER PUBLICATIONS

International Search Report dated Dec. 17, 2007, issued in Application No. DE 10 2007 014 612.6.

* cited by examiner

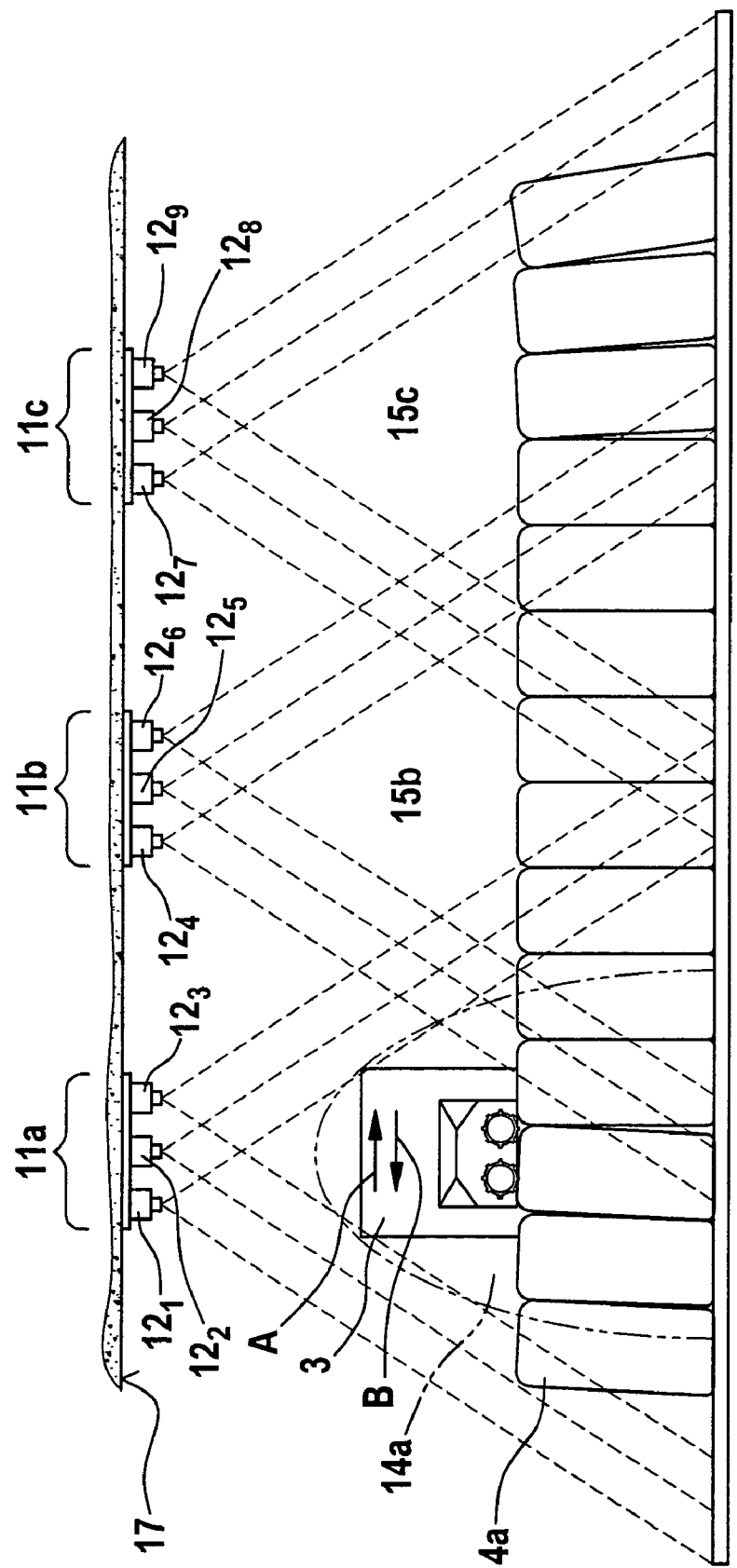

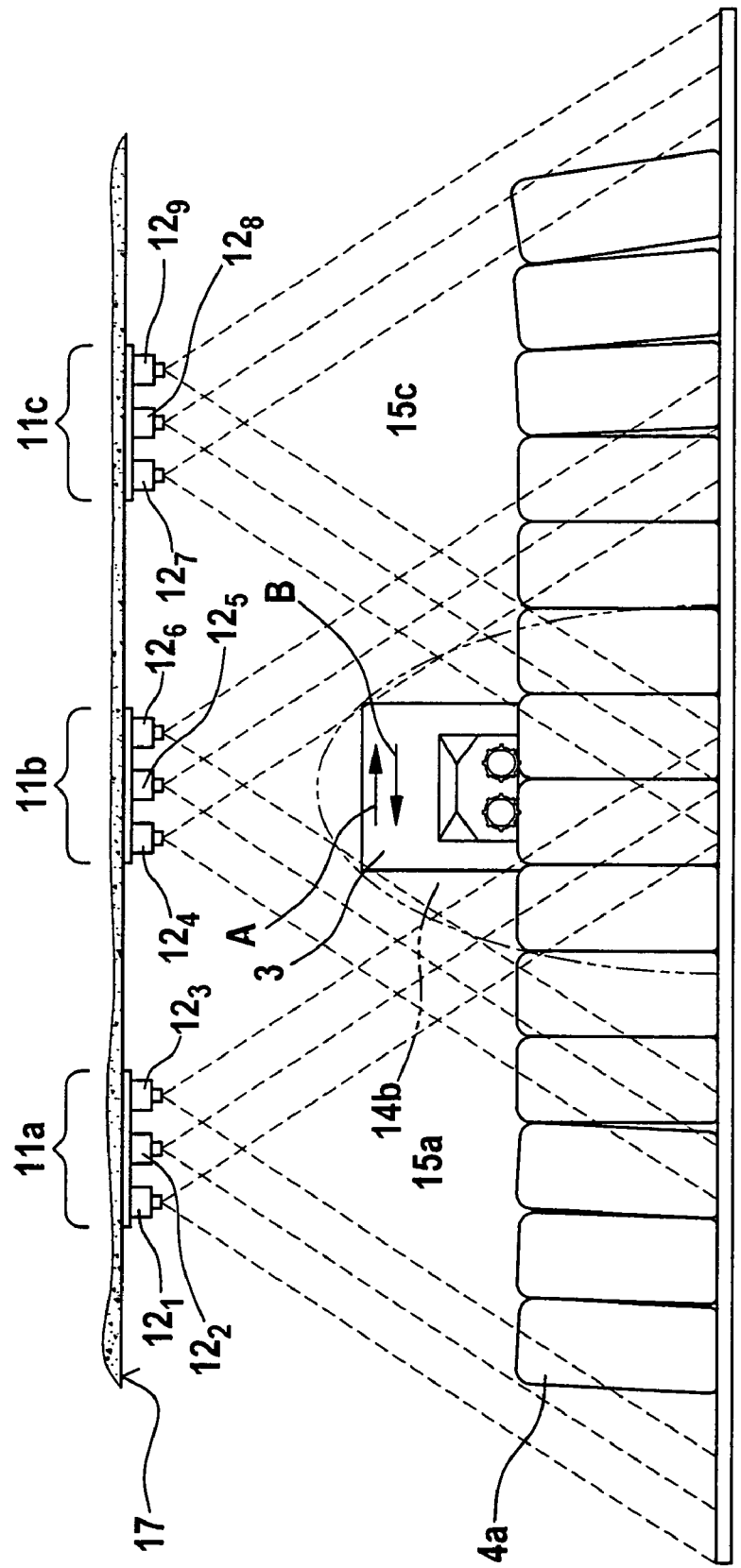

APPARATUS FOR MONITORING AND SECURING DANGER ZONES ON POWER-DRIVEN TEXTILE MACHINES

CROSS-REFERENCE TO RELATED APPLICATION

This application claims priority from German Patent Application No. 10 2007 014 612.6 dated Mar. 23, 2007, the entire disclosure of which is incorporated herein by reference.

BACKGROUND OF THE INVENTION

The invention relates to an apparatus for monitoring and securing danger zones on power-driven textile machines, in particular spinning preparatory machines, for example, bale openers for textile fibre bales.

Power-driven textile machines typically have movable machine parts in which a security device comprises optical monitoring means which monitor a movable danger zone to form a movable protection zone such that a person and/or an objected intruding into the danger zone triggers a switching operation.

In practice, devices for protecting dangerous work elements are present on textile machines, for example, on what are called bale strippers. In the textile industry, especially in spinning preparation, machines for working-off fibre bales standing on the ground are known. Since the work elements used there, for example, stripping rollers, are by the nature of the system located at constantly changing positions and cannot be covered, they represent a considerable danger, inter alia for the personnel operating the machines. The working areas of the machines are therefore nowadays amply guarded by suitable installations, for example, a plurality of light barriers. Owing to the technology used, the complete working area is always inaccessible and can only be entered when the machine is at a standstill and production has been interrupted. Since the laid-down bales are often contaminated with foreign bodies, it would be desirable to be able to remove these without having to interrupt operation of the machine. The drawback is that an interruption leads in some cases to considerable production losses.

In the case of a known apparatus (EP 0 379 465 A), the problematic danger area is shielded by sensors and/or mechanical means. For that purpose, protection means in the form of sensors are provided, which cover a monitoring area laterally below and/or frontally below or directly below the movable working-off element. A plurality of sensors, for example, infrared sensors, which are disposed more or less all the way around the stripper element, create a kind of protective curtain. This is intended to be controlled in such a way that the fibre bales are not detected, but a person entering the area is. All sensors are located on moving parts, in particular the tower and the stripper element, of the machine, i.e. there is a mechanical connection (linking) between the sensors and the machine. One disadvantage is that the sensors have to be moved to produce movable protection zones. In particular it is problematic that the sensors and evaluation systems are secured to the moving machines or machine parts subjected to quite considerable vibrations, which leads to disruptions and dangerous failures of the safety system.

SUMMARY OF THE INVENTION

It is an aim of the invention to produce an apparatus of the kind described initially, which avoids or mitigates the said disadvantages, which in particular allows guarding of danger areas in a simple manner, which is free from mechanical malfunctions and has a high system reliability.

The invention provides an apparatus for monitoring and securing danger zones on a textile machine having movable machine parts with which is associated a movable danger zone, the apparatus comprising a stationary optical monitoring device, which monitors the movable danger zone, the stationary monitoring device being selectively activatable and forming a dynamically movable protection zone around the movable danger zone such that a person and/or an object intruding into the danger zone triggers a response, for example a switching operation or an alarm.

According to the invention, the stationary monitoring device, which may be, for example a fixed camera system having cameras, can form a three-dimensional and dynamic safety zone. With the cameras fixed, the at least one safety zone travels progressively with the movable danger area, for example, around the stripper element of the bale opener. The movable danger area is thus constantly covered by a safety blanket (guarded zone). The monitoring means, for example, cameras, which, in contrast to the sensors of the known apparatus, are stationary, are substantially or wholly unaffected by the quite considerable vibrations of the production machine. The monitoring means, for example cameras, and the moving parts of the machine are not mechanically coupled to one another. In one embodiment, a particular advantage lies in the use of security cameras and evaluation systems which, even when subcomponents are damaged, can ensure the mandatory guarding of the danger zones through back-up components provided in parallel.

Advantageously, the monitoring means comprise at least one camera system. Advantageously, each camera comprises at least two cameras. Advantageously, the cameras are arranged in succession in the direction of the movable danger zone. Advantageously, at least two camera systems are arranged in the direction of the movable danger zone. Advantageously, the cameras are selectively activatable in dependence on the movable danger zone. Advantageously, depending on the position of the movable danger zone, at any one time different cameras are activatable.

In one embodiment, the cameras are security cameras. Advantageously, camera evaluation systems are associated with the security cameras.

It is preferred that the safety zones, viewed in the direction of the movement of the danger areas, are arranged in succession. Advantageously, the camera systems, viewed in the direction of movement of the danger areas, are arranged in succession. Advantageously, the security cameras, viewed in the direction of movement of the danger areas, are arranged in succession. The arrangement is preferably such that, intrusion of a person or an object from the outside into the secured area (safety zone), a response, for example, a switching operation or the like, is triggerable. Advantageously, an inner and an outer safety zone are formed. In that case, it is advantageous that the triggered response is dependent on which of the safety zones has been entered or breached. Advantageously, when the outer zone is entered, the speed at which the machine is moving is reduced, the machine continuing to produce. Advantageously, when the inner zone is entered, all movement drives are stoppable. Advantageously, the position of the safety zones is dependent on the position of the movable work element in a first direction, for example, in a first working direction. In certain embodiments, the safety zones may be alterable in dependence on the position of the work element in a second direction, for example, in dependence on the height.

The monitoring device, for example one or more camera systems of said device are preferably connected to an evaluator system to form a safety system, which is preferably connected to the machine control and constantly receives information about the position of the work element. That arrangement is advantageous in allowing for selected regions of a larger working area to be monitored, those selected regions corresponding to the position of a danger zone in the vicinity of a working element, and the selected regions changing as the position of the working element is changed. In that way, a relevant safety zone can be activated as and when appropriate. When an activated safety zone is breached, an alarm or other response may be triggered. When one of the safety zones is breached, an acoustic and/or visual signal is advantageously given.

It is preferred that the safety zones surround the dangerous work elements such that it is impossible for a person to touch the elements without breaching the safety zones and thus triggering an appropriate response. Preferably, when the outer safety zone is breached and subsequently vacated without the inner safety zone being breached, the textile machine automatically produces again at full speed.

Where a camera and evaluation system is present, that may also be used to detect foreign bodies, contaminants etc. Advantageously, when foreign bodies are detected, appropriate information can be given about the position thereof. For example, detected foreign bodies can be depicted on the monitor of the machine control. If desired, the security cameras and evaluation systems comprise redundantly constructed hardware components. Advantageously, the security cameras and evaluation systems comprise software programs operating in parallel.

In certain preferred embodiments, the monitoring device is arranged above the textile machine. Thus, cameras or other forms of monitoring device may be arranged above the textile machine, for example, mounted on the ceiling or on a support structure that is not mechanically connected to the working element of the machine. Preferably, the coverage areas of cameras arranged side by side overlap one another. Preferably, the camera systems and evaluation systems are connected to the machine control of the textile machine. Expediently, camera systems arranged in succession are permanently on. Preferably, the safety zones are automatically adaptable to the position of the danger areas, for example, of the stripper element. Preferably, at least one three-dimensional, dynamic access area (accessible area) is present. Advantageously, at least one access area is arranged outside at least one protection zone. Advantageously, in the working position of the stripping element the respective associated danger area (I or II) is guarded by a part of the camera system, wherein in each case after rotation of the stripping element into a different working position a signal transmitter switches over from the one part of the camera system (for example, for danger area I) to a different part of the camera system (for example, for danger area II). Preferably, the switch-over is effected after completed rotation of the stripping element through 180°. Preferably, the protection zone is three-dimensional.

The invention also provides an apparatus for monitoring and securing danger zones on power-driven textile machines, in particular spinning preparatory machines, for example, bale openers for textile fibre bales, having movable machine parts, in which a security device comprises optical monitoring means, which monitor a movable danger zone to form a movable protection zone such that a person and/or an object intruding into the danger zone triggers a switching operation, wherein stationary monitoring means are present, which are selectively activatable and form a dynamically movable protection zone around the movable danger zone.

BRIEF DESCRIPTION OF THE DRAWINGS

FIGS. 5a to 5c are side views of an apparatus according to the invention, the stripping element being located in a first protection zone (FIG. 5a), in a second protection zone (FIG. 5b), and a third protection zone (FIG. 5c) respectively;

DETAILED DESCRIPTION OF CERTAIN PREFERRED EMBODIMENTS

Figure 1:
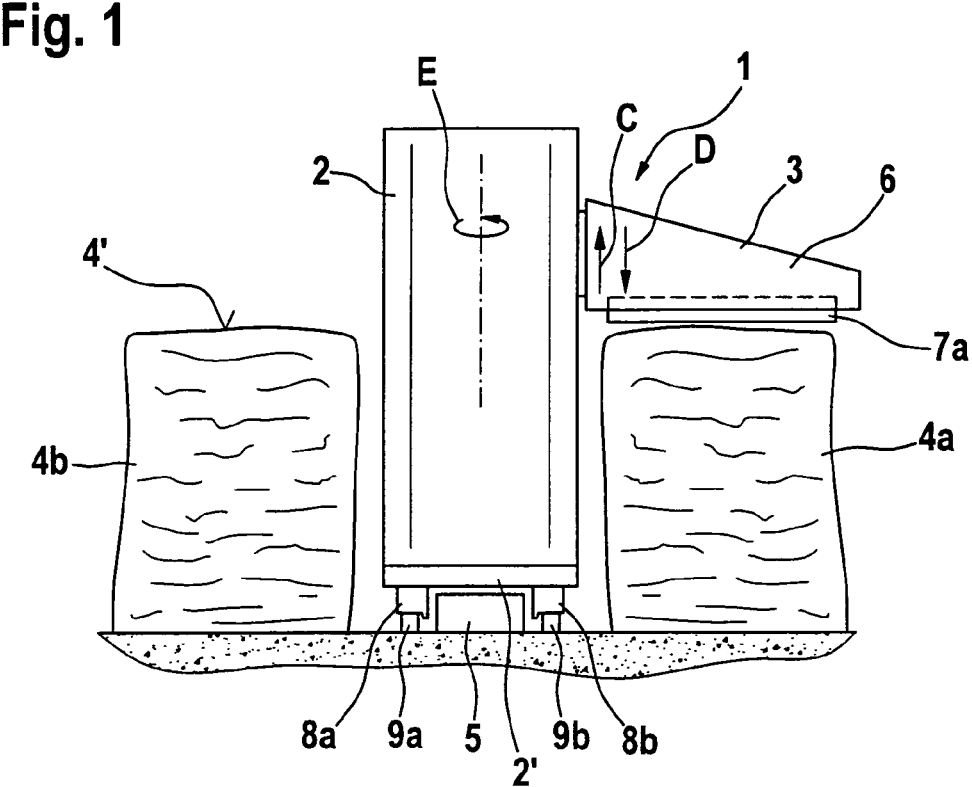
FIG. 1 is a schematic front view of a bale opener with a traversing tower with stripping element, assigned to two rows of bales.
Figure 2:
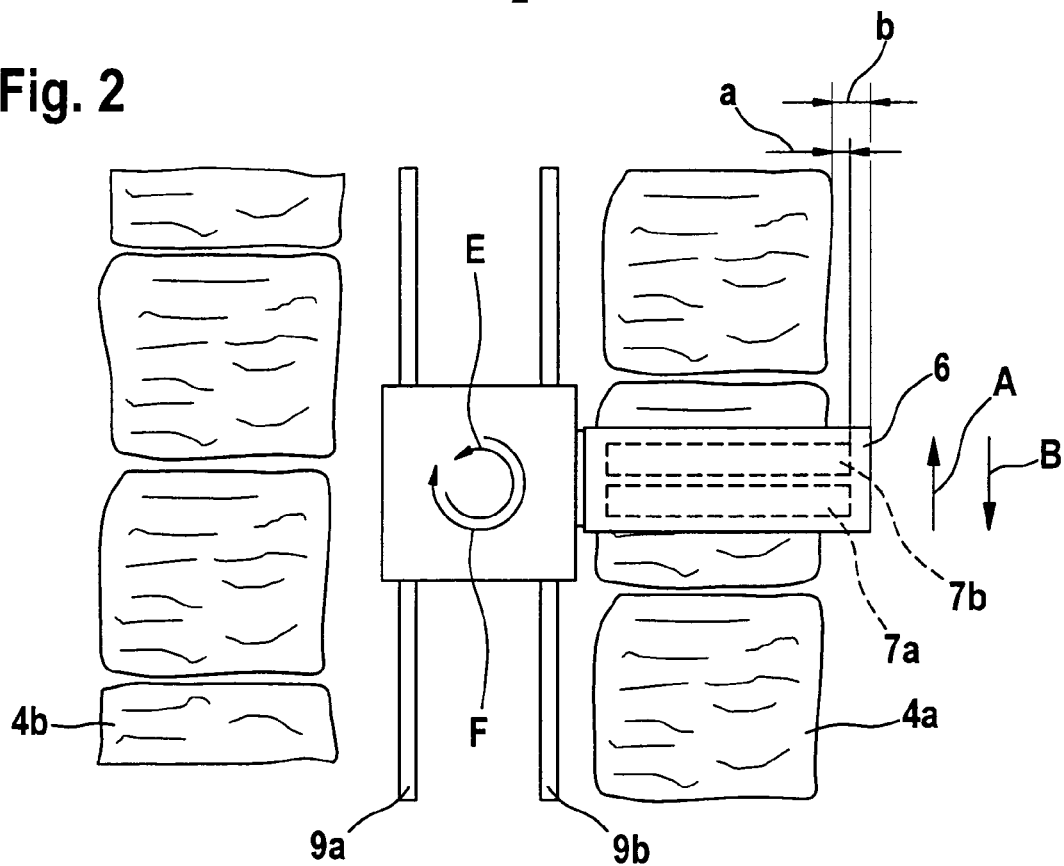
FIG. 2 shows the bale opener according to FIG. 1 in plan view with two rows of bales.

A first embodiment of the invention is shown in FIGS. 1 to 4. With reference to FIG. 1, a bale opener 1, for example, an automatic bale opener BLENDOMAT BO-A made by Trützschler GmbH & Co. KG, of Mönchengladbach, Germany, comprises a movable tower 2 (tower and chassis) with a stripping element 3 (boom), which removes fibre tufts from fibre bales 4a, 4b set up in rows, the tufts being extracted by suction through a suction channel 5. The tower 2 together with the stripping element 3 is movable back and forth in directions A and B (see FIG. 2). The stripping element 3 comprises a housing 6, in which two high-speed rotating stripping rollers 7a, 7b (see FIG. 3) are disposed. The fibre tufts removed by the stripping rollers 7a, 7b are conveyed pneumatically through the housing 6 into the channel 5. The stripping element 3 is movable vertically in the direction of the arrows C and D. The upper part of the tower 2 is rotatable in the directions E and F about a vertical axis, the result being that after working off one row of bales 4a, subsequently the row of bales 4b that has been laid out parallel in the meantime can be worked off. The tower 2 has drivable wheels 8a, 8b on its underside, by which the bale opener 1 traverses back and forth on rails 9a, 9b in directions A and B (see FIG. 2). The high-speed stripping rollers 7a, 7b extend beyond the width of the fibre bales 4a, 4b by a certain distance a. In particular in the region of the end face of the stripping element 3a there is a considerable danger area resulting from the projection of the stripping cylinders 7a, 7b in the space a. The danger area is enlarged further when the extension arm 3 with the stripping rollers 7a, 7b is lifted off the bale surface 4' or driven beyond the end limits of the bale rows 4a, 4b. Finally, the movable tower 2 with the chassis and the movable housing 6 also constitute considerable danger areas for personnel. The front face of the housing 6 extends beyond the width of the fibre bales 4a, 4b by a distance b.

Figure 3:
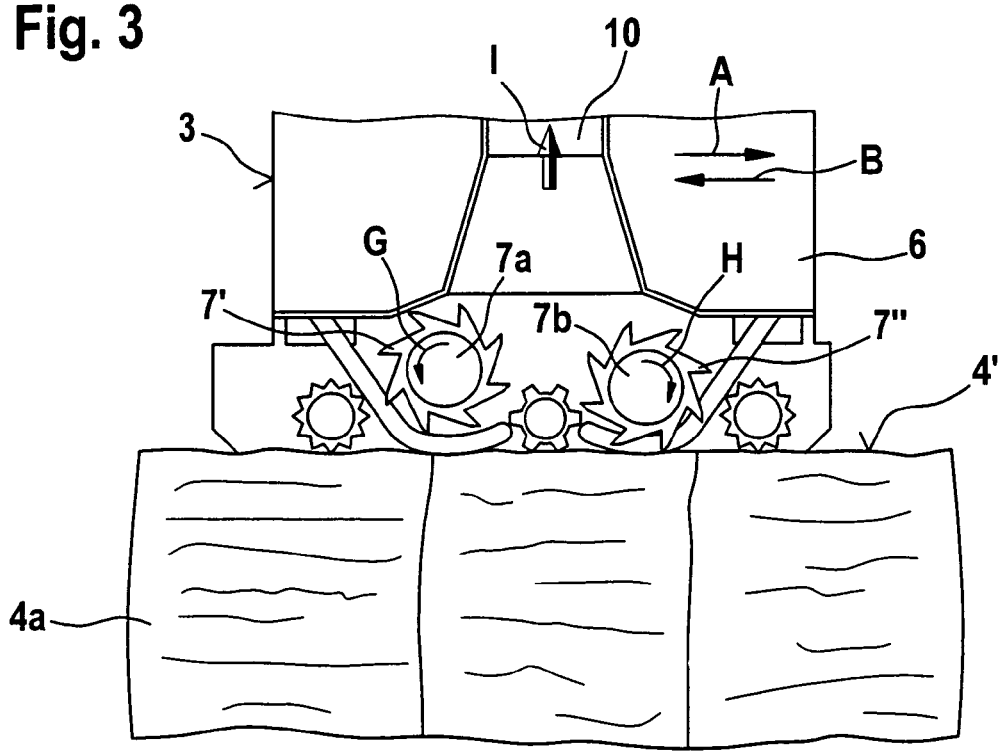
FIG. 3 is a side view of the movable stripping element of the bale opener of FIGS. 1 and 2 in section with bales of fibre.

Referring to FIG. 3, the high-speed stripping rollers 7a, 7b rotate in opposite directions G and H. The stripping rollers 7a, $7b$ each have toothed rings $7'$, $7''$, the teeth of which detach the fibre tufts from the bale surface $4'$ and fling them into a suction chamber from which they are extracted in direction I.

Figure 4:
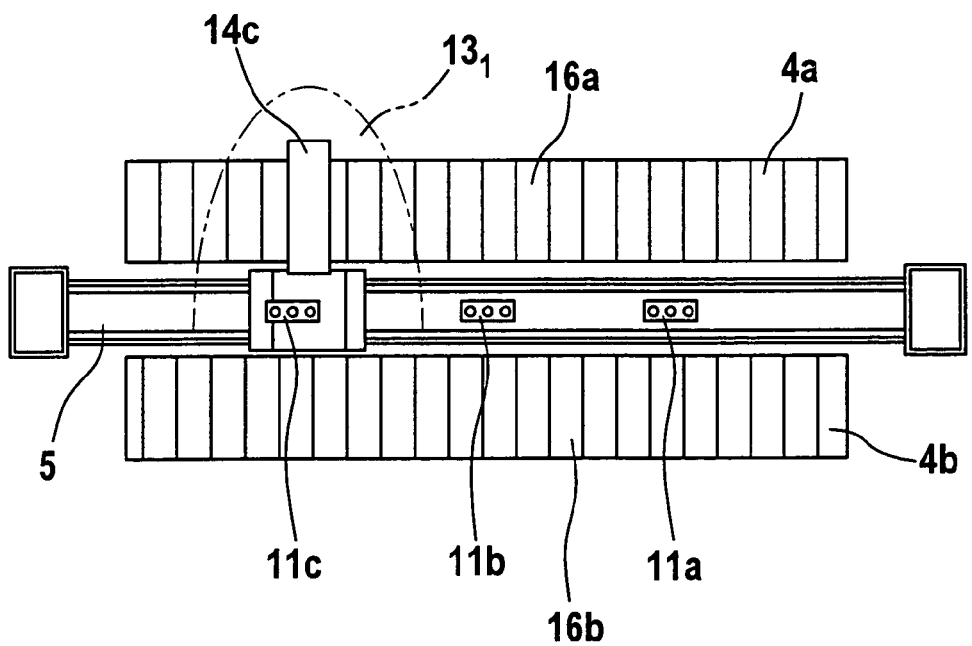
FIG. 4 is a plan view of the bale opener of FIGS. 1 to 3 with two rows of bales, with a part of the camera system protecting the danger zone on the row of bales row that is being worked off.

With reference to FIG. 4, above the tower 2 of the bale opener 1 there are three stationary camera systems $11a$, $11b$, $11c$, each of which comprises three security cameras $12_1$ to $12_3$, $12_4$ to $12_6$ and $12_7$ to $12_9$ arranged in succession (see FIGS. $5a$ to $5c$). The camera systems may be mounted, for example, on the ceiling or on a structure otherwise not directly connected to the machine. In the example shown, the stripping element 3 is located above the bale row $4a$ and below the camera system $11c$ (see FIG. $5c$). Around the movable stripping element 3 there is a danger zone $13_1$, which is monitored by the stationary camera system $11c$ and guarded by the movable protection area $14c$. The cameras $12_7$ to $12_9$ of the camera system $11c$ are able to monitor only the danger zone $13_1$ on the side of the bale row $4a$, i.e. in the work area $16a$. The region of the bale row $4b$, i.e. the work area $16b$, is meanwhile not monitored by the camera systems $11a$ to $11c$, and is freely accessible. When the stripping element is rotated to remove fibre from bale row $4b$, monitoring is ceased in the work area $16a$, and monitoring commences in the work area $16b$ in analogous manner to that just described with reference to work area $16a$.

In an embodiment shown in FIGS. $5a$ to $5c$, above the movable tower 2 (see FIG. 1) inclusive of the movable stripping element 3 of the bale opener 1 and above the bale row $4a$, three stationary camera systems $11a$, $11b$, $11c$ are mounted on the ceiling surface 17 of the spinning works room in succession in the direction of movement of the bale opener 1 (arrows A and B). The camera systems $11a$ to $11c$ each comprise three security cameras $12_1$, $12_2$, $12_3$; $12_4$, $12_5$, $12_6$ and $12_7$, $12_8$, $12_9$ respectively arranged in succession. The cameras $12_1$ to $12_9$ are security cameras, which have a high system reliability. The same is true of the electronic evaluation systems, to which the security cameras $12_1$ to $12_9$ are connected. According to FIG. $5a$, the stripping element 3 is located beneath the camera system $11a$. The cameras $12_1$ to $12_9$ of the camera systems $11a$ to $11c$ are permanently on. The cameras $12_1$ to $12_9$ thus permanently record the entire working region of the bale row $4a$. The drive control of the bale opener 1 and the control system of the camera systems $11a$ to $11c$ are electronically linked (see FIG. 6), whereby the relevant camera system $11a$ is activated above the particular location of the stripping element 3. A protected zone $14a$ is thus formed in the danger zone $13_1$ around the stripping element 3. The areas $15b$, $15c$ of the work area $16a$ not protected during that time are freely accessible. Should a person or an object intrude into the protected zone $14a$, the person or the object are captured by the cameras $12_1$ to $12_3$, identified in the electronic evaluation system as a person or object, and the drives of the bale opener 1 are promptly switched off as quickly as possible. According to FIG. $5b$, the stripping element 3 is located beneath the camera system $11b$. Compared with FIG. $5a$, the stripping element 3 has moved in direction A. The movable danger zone $13_1$ has thus moved likewise (automatically) in direction A. At the same time, the bale opener 1 with the stripping element 3 has traveled into the monitored area beneath the camera system $11b$, which is thereby activated. The evaluation system of the cameras $12_4$ to $12_6$ in this way creates the protected zone $14b$, whilst the areas $15a$ and $15c$ beneath the cameras $11a$ and $11c$ are freely accessible. The camera systems $11a$ and $11c$ are passive, i.e. they do not respond to persons or objects in the areas $15a$ and $15c$ to form a protected zone 14. According to FIG. $5c$, the stripping element 3 is located beneath the camera system $11c$. The stripping element 3, compared with FIG. $5b$, has moved yet further in direction A. The movable danger zone $13_1$ has thus automatically moved likewise in direction A. At the same time, the bale opener 1 with the tower 2 and the stripping element 3 has entered the monitoring area beneath the camera system $11c$, which is thereby activated. The evaluation system of the cameras $12_7$ to $12_9$ in this way creates the protected zone $14c$, whilst the areas $15a$ and $15b$ beneath the cameras $11a$ and $11b$ are freely accessible, for example, for inspection work or the like.

Figure 6:
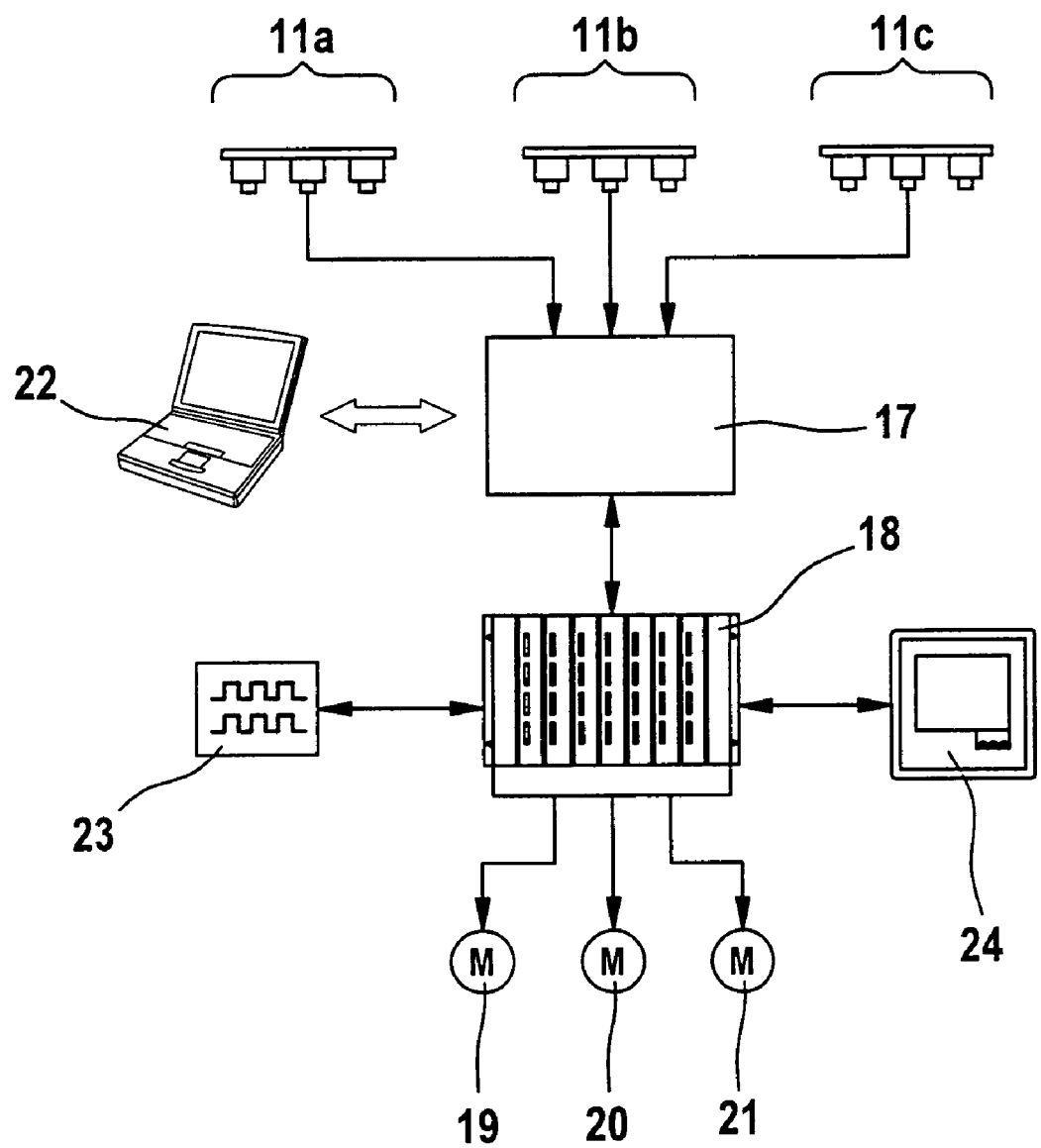
FIG. 6 is a schematic block diagram of a control and evaluation device for an apparatus according to the invention.

FIG. 6 shows one form of control arrangement for use with or in an apparatus according to the invention. The security camera systems $11a$, $11b$, $11c$ with the security cameras $12_1$ to $12_9$ are in connection via a safety-oriented electrical image acquisition and evaluation device 17 to an electrical control and regulating arrangement 18, for example, the Trützschler TMS-2, to which drive motors 19, 20, 21 for driving the bale opener 1 are connected. A programming system 22 for determining the protected zones $14a$, $14b$, $14c$ and the safety zones $14^I$, $14^{II}$ (see FIG. 7) is connected to the image acquisition and evaluation device 17. Additionally, a device 23 for detecting the position of the stripping element 3 (or the tower with the chassis $2^I$), and an operating and display unit 24 of the machine are connected to the control and regulating arrangement 18. By this means, a three-dimensional and dynamic safety area is formed, which is automatically always adapted to the position of the work elements. To satisfy this function, a connection between the safety system and the machine control 18 is absolutely necessary (FIG. 6). The machine control must at all times communicate to the safety system at least the current location of the bale opener 1, or rather the position of the stripping element 3. The entire safety system, especially the acquisition and evaluation system 17, can be programmed and adjusted by means of a suitable arrangement, for example, a personal computer 22 with appropriate software. This applies both to the one or more safety zones formed around the machine and around the dangerous elements and the laid-down bales 4, and to various other functions.

Figure 7:
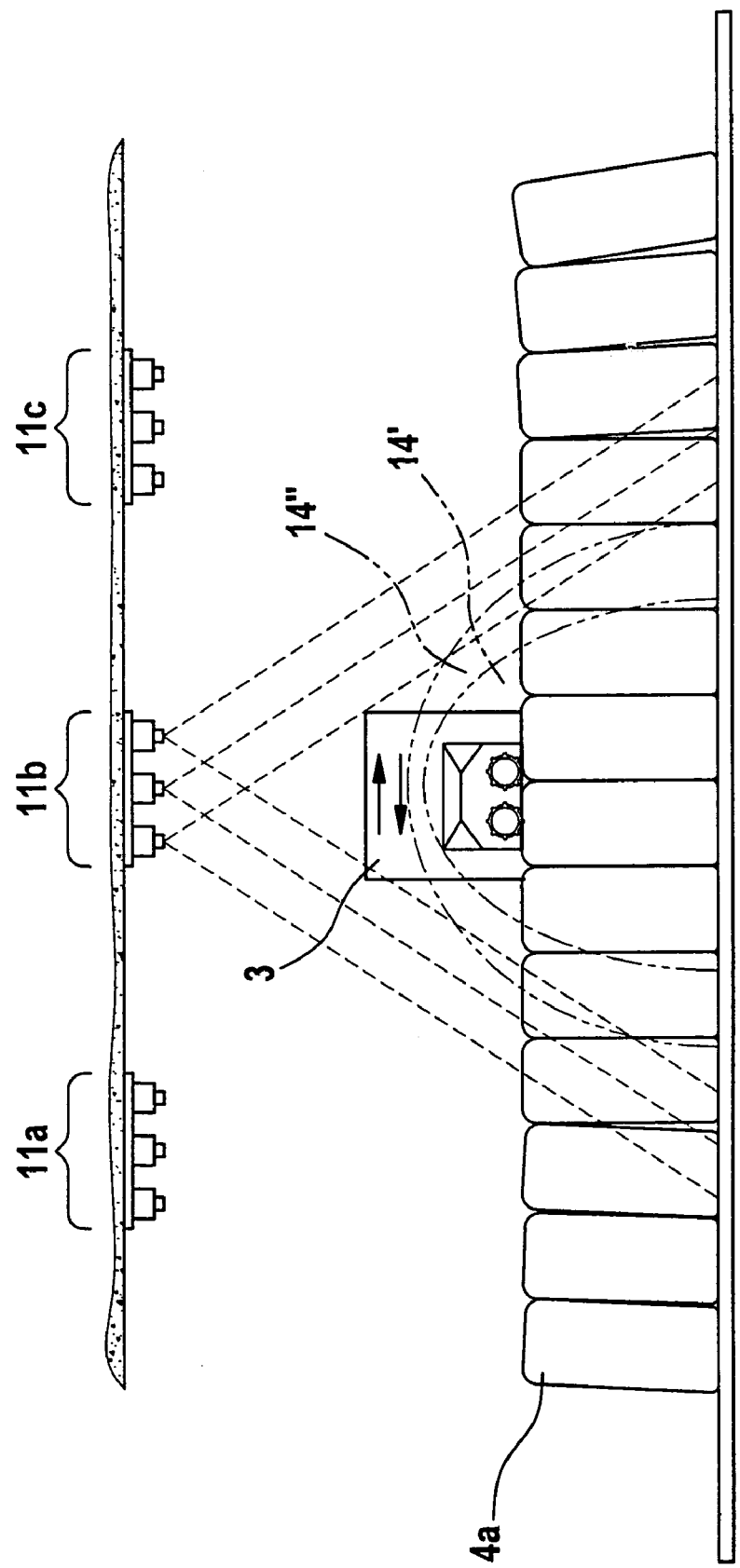
FIG. 7 shows an apparatus according to the invention with a protection zone comprising two safety zones.

The embodiment shown in FIG. 7 corresponds in respect of the arrangement of the camera systems $11a$ to $11c$ and the bale row $4a$ and also the position of the stripper element 3 to the embodiment shown in FIG. $5b$. For reasons of clarity, the coverage areas beneath the camera systems $11a$ and $11c$ in FIG. 7 are not shown, but are present. As shown in FIG. 7, an outer safety zone $14^I$ and an inner safety zone $14^{II}$ are formed around the work element 3. If a person or miscellaneous object enters the outer safety zone $14^I$, then the bale opener 1 moves on at a reduced working speed, without production (removal of tufts) being interrupted. If a person or an object enters the inner safety zone $14^{II}$, however, all drives (drive motors 19, 20, 21) are immediately shut down and any movement of the bale opener 1 is stopped. In addition, as soon as the safety zone $14^I$ is breached, an alarm signal, for example, an optical or acoustic signal, can be activated. A person, for example, can thus vacate the safety zone $14^I$ immediately, so that the working speed is increased again for full production.

Figure 8:
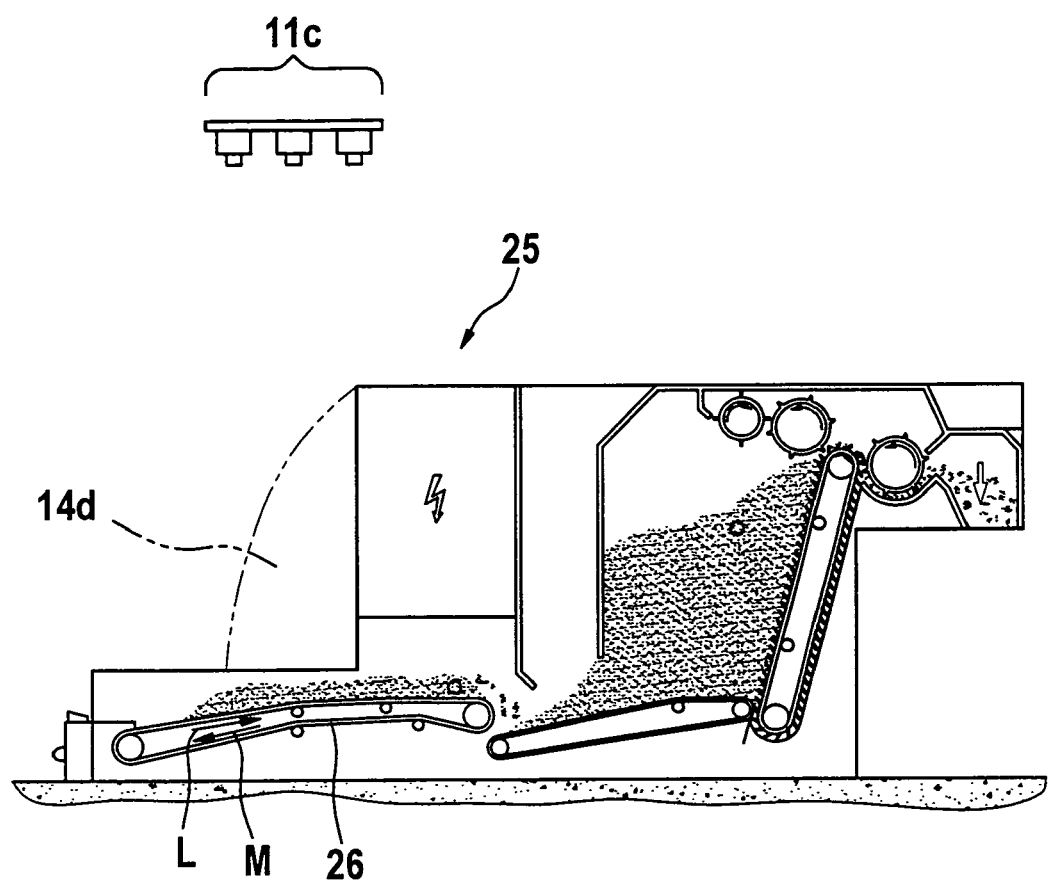
FIG. 8 shows a further embodiment of the apparatus according to the invention on a bale opener with stationary feed table for fibre material and a conveyor belt.

FIG. 8 shows a further embodiment of the apparatus according to the invention on a bale opener 25, for example, the bale opener BO-U manufactured by Trützschler GmbH & Co. KG, of Mönchengladbach, Germany, which comprises a stationary feed table with an endless conveyor belt 26 revolving in the direction of the arrows L and M, on the upper belt section of which (not shown) fibre material to be opened is placed. A stationary camera system $11d$ with three security systems $12_{10}$ to $12_{12}$ is provided above the conveyor belt 26. A protection zone $14d$ is thus formed.

Figure 5C:
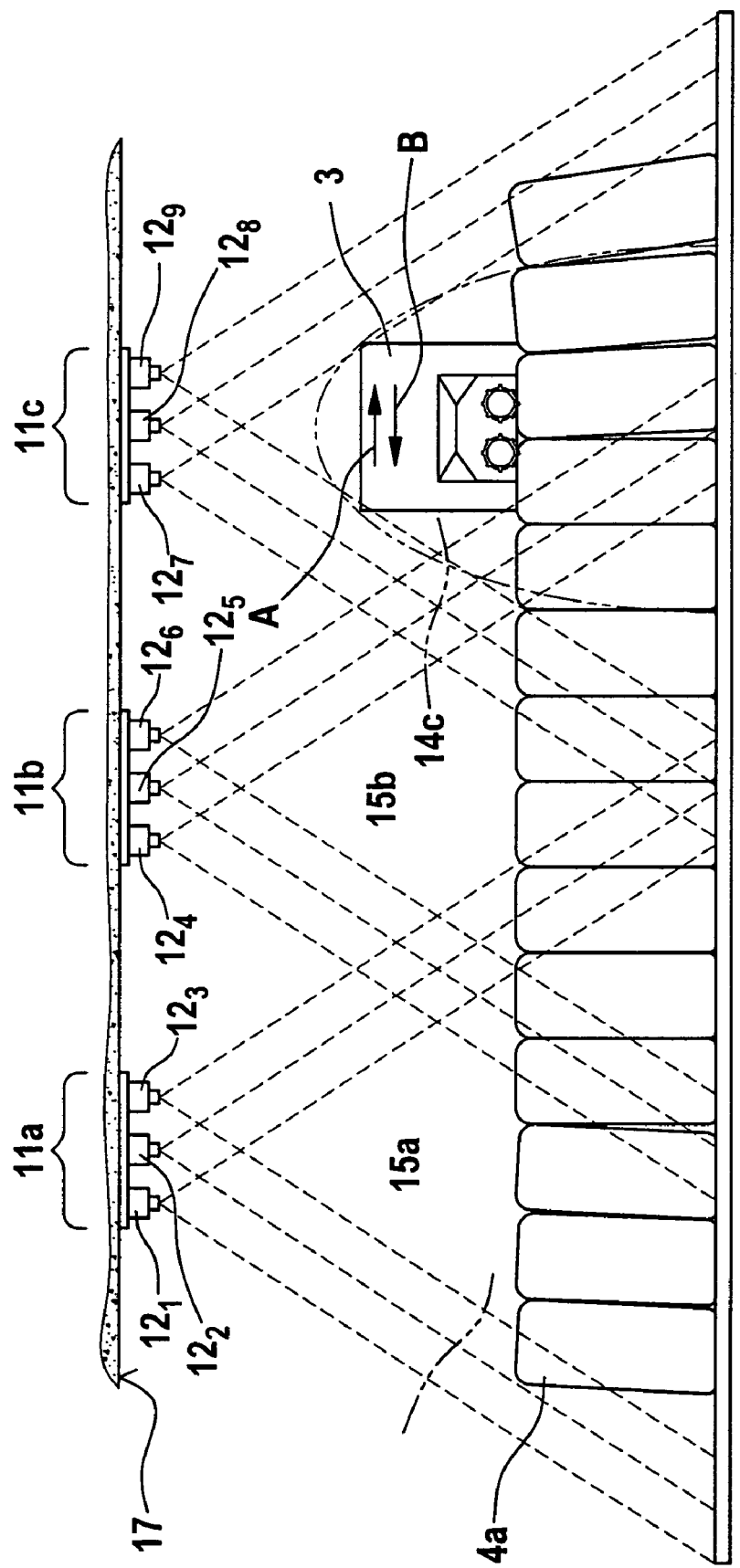

Using the apparatus according to the invention, the dangerous work elements, (for example, stripping element 3) are observed by means of one or more reliable camera systems 11 to 11*d* arranged above the machine. By means of the images recorded by them and a reliable image data acquisition system 17 and its safety-oriented integration in and connection to the machine control 18, a corresponding monitoring is achieved. That is, around the stripper element 3 with, for example, the stripping rollers 7*a*, 7*b*, a three-dimensional protection zone 14*a*, 14*b* and 14*c* moving with the stripper element 3 is formed, and the remainder 15*a*, 15*b*, 15*c* of the working area 16*a* is freely accessible (FIGS. 5*a*, 5*b*, 5*c*). As soon as a person or a miscellaneous object intrudes into this protection zone 14*a*, 14*b* 14*c* from the outside, a response of the machine 1 is triggered. This can be an immediate absolute shutdown or "just" a slowing of the work elements. In this way it is possible to enter parts of the work areas 16*a*, 16*b* where there is no work element 3 just at that time, and for example, remove foreign bodies.

The invention can provide inter alia the following advantages:
1. Only the part of a machine 1 in which the working-off element 3 is at that moment located is guarded and cannot be entered by personnel without eliciting a machine response.
2. The remaining regions 15*a*, 15*b* and 15*c* are freely accessible and offer inter alia an opportunity for detected foreign bodies to be removed, bales 4*a*, 4*b* to be straightened or the remains of bales to be laid on top, without stoppage of the machine 1.
3. The productivity of the machine 1 can be substantially increased.

Further advantages that may be obtainable in use of one or more embodiments of the invention are:
1. Should the position detection system 23 for the work element 3 in the machine 1 have a defect, this information is forwarded directly to the security system, which is then able to treat the entire work area 16*a*, 16*b* as a safety zone.
2. Depending on the size of the work area 16*a*, 16*b*, one or more camera systems 11*a* to 11*c* are used.
3. A plurality of safety zones 14$^I$, 14$^{II}$, are formed around the work element 3, for example, an outer and an inner safety zone (FIG. 7). If a person or a miscellaneous object moves into the outer zone 14$^I$, the machine 1 continues to move at a reduced working speed, without interrupting production. If something enters the inner zone 14$^{II}$, then immediately all drives 19, 20, 21 are shut down and any movement is stopped.
4. If the safety zones 14 are entered, then an alarm device (visual, acoustic etc.) draws attention to this situation. If the zones are completely vacated again, then the alarm may be switched off automatically and production can be started up again automatically.
5. The machine control 18 can also be used for parameterisation and determination of the safety zones.
6. The camera and evaluation system serving for protection may be additionally capable of scanning the bale surface 4, permanently for possible contaminants or foreign bodies (e.g. a spanner, stones etc.). If one such is present, then the system is able to send a signal to the machine control 18 and this can initiate an appropriate response. In this connection, this could be inter alia stoppage of the machine 1 (interruption of production), a visual or acoustic alarm signal and the depiction of the position of the foreign body on the bale row 4*a*, 4*b* using a suitable monitor. For that purpose preferably the screen of the machine control 18 could be used.

Activatable or activated means that the monitoring means are capable of generating or forming a protection zone. Deactivatable or deactivated means that a generated protection zone is being respectively has been removed again.

Although the foregoing invention has been described in detail by way of illustration and example for purposes of understanding, it will be obvious that changes and modifications may be practised within the scope of the appended claims.

What we claim is:

1. An apparatus for monitoring and securing a moveable danger zone that is associated with a movement of a moveable machine part of a textile machine, the apparatus comprising:
a stationary optical monitoring device to monitor the movable danger zone, wherein the stationary optical monitoring device is selectively activatable to form a dynamically movable protection zone around the movable danger zone such that a person and/or an object intruding into the moveable danger zone triggers a switching operation.

2. The apparatus according to claim 1, wherein the stationary optical monitoring device comprises at least one camera system.

3. The apparatus according to claim 2, wherein the at least one camera system comprises a plurality of camera systems arranged in succession in a movement direction of the movable danger zone, each camera system comprising at least two cameras.

4. The apparatus according to claim 3, wherein the at least two cameras are arranged in series in the movement direction of the movable danger zone.

5. The apparatus according to claim 4, wherein the at least two cameras are selectively activatable depending on a position of the movable danger zone.

6. The apparatus according to claim 4, wherein the at least two cameras are arranged side by side and overlap one another.

7. The apparatus according to claim 3, wherein the plurality of camera systems are arranged above the textile machine.

8. The apparatus according to claim 1, further comprising at least one evaluation system associated with the stationary optical monitoring device, the stationary optical monitoring device and the at least one evaluation system being connected to a machine control of the textile machine from which information relating to the movement of the movable machine part is obtainable.

9. The apparatus according to claim 1, wherein the dynamically movable protection zone comprises a plurality of safety zones which are independently activatable by selective activation of the stationary optical monitoring device, and the safety zones, viewed in a movement direction of the moveable danger zone, are arranged in succession.

10. The apparatus according to claim 9, wherein the plurality of safety zones are automatically adaptable to the position of the moveable danger zone.

11. The apparatus according to claim 1, wherein a position of the dynamically moveable protection zone is dependent on a position of the movable machine part in a first direction and the dynamically moveable protection zone is further alterable in dependence on the position of the moveable machine part in a second direction.

12. The apparatus according to claim 1, wherein the dynamically moveable protection zone comprises an inner and an outer safety zone.

13. The apparatus according to claim 12, wherein breach of a person and/or an object in the inner or the outer safety zone results in a different triggered response.

14. The apparatus according to claim 13, wherein a speed of the movable machine part is reduced when a person and/or an object enters the outer safety zone, however the textile machine continues to operate.

15. The apparatus according to claim 13, wherein, when the outer safety zone is breached by a person and/or an object and the outer safety zone is subsequently vacated without the inner safety zone being breached, the textile machine automatically produces again at full speed.

16. The apparatus according to claim 13, wherein the moveable machine part and the textile machine are both stoppable when the inner safety zone is breached by a person and/or an object.

17. The apparatus according to claim 12, wherein at least one of an acoustic or visual signal is produced when one of the internal or external safety zones is breached.

18. The apparatus according to claim 8, wherein the monitoring device and the at least one evaluation system are usable to detect foreign bodies and contaminants.

19. The apparatus according to claim 1, further comprising at least one three-dimensional, dynamic access area outside of the dynamic movable protection zone to access the movable machine part.

20. The apparatus according to claim 1, wherein the moveable machine part comprises a stripping element having at least a first and a second general working region, wherein the first and second general working regions include respective first and second movable danger zones that are monitored by the stationary optical monitoring device, and wherein a signal transmitter switches over from the one part of the stationary optical monitoring device associated with the first movable danger zone to a different part of the stationary optical monitoring device associated with the second movable danger zone.

* * * * *